United States Patent [19]

Coccaro

[11] Patent Number: 4,690,605
[45] Date of Patent: Sep. 1, 1987

[54] APPARATUS FOR JACKING AND DOLLYING AN AFFIXED VEHICLE WHEEL ASSEMBLY

[76] Inventor: Albert V. Coccaro, 9 Capricorn La., Bedford Hills, N.Y. 10507

[21] Appl. No.: 771,243

[22] Filed: Aug. 30, 1985

[51] Int. Cl.⁴ .............................................. B60B 29/00
[52] U.S. Cl. ..................................... 414/429; 254/134; 254/8 R; 254/129; 254/131; 254/119; 414/426; 414/911; 414/427
[58] Field of Search ................ 414/426, 427, 428, 429, 414/667, 671, 910, 911, 540, 589, 590, 458; 254/5 R, 8 R, 5 B, 8 B, 133 R, 134, 88, 2 R

[56] References Cited

U.S. PATENT DOCUMENTS

| | | |
|---|---|---|
| 1,964,119 | 6/1934 | Hendry . |
| 2,170,607 | 8/1939 | Green . |
| 2,217,898 | 10/1940 | Gemmill . |
| 2,332,443 | 10/1943 | Foringer . |
| 2,345,458 | 3/1944 | Caron . |
| 2,362,981 | 11/1944 | Baum .................................... 414/428 |
| 2,380,415 | 7/1945 | Carruthers . |
| 2,386,516 | 10/1945 | Thompson . |
| 2,410,902 | 11/1946 | Roberts . |
| 2,452,481 | 10/1948 | Morehead et al. ................... 414/428 |
| 2,471,051 | 5/1949 | Tway . |
| 2,613,084 | 10/1952 | Burch . |
| 2,695,718 | 11/1954 | Epps ..................................... 414/429 |
| 3,145,859 | 8/1964 | Barosko ............................... 414/427 |
| 3,172,642 | 3/1965 | Eitel ................................ 254/134.3 R |
| 3,836,027 | 9/1974 | Gardner ............................... 414/427 |
| 3,954,198 | 5/1976 | Sedelmayer ......................... 414/429 |
| 4,093,495 | 6/1978 | Colombani ...................... 414/426 X |
| 4,401,405 | 8/1983 | Ealet .................................... 414/428 |

FOREIGN PATENT DOCUMENTS

2419177 11/1979 France ................................ 414/427

*Primary Examiner*—Frank E. Werner
*Attorney, Agent, or Firm*—Paul C. Scifo

[57] ABSTRACT

An apparatus for jacking and dollying a vehicle wheel assembly, while the assembly remains affixed to the vehicle, the wheel assembly including a pneumatic tire, a wheel and an axle. The apparatus features wheel engaging elements and an actuator mounted on an apparatus framework, the framework itself being supported on casters. The wheel engaging elements and actuator cooperate to provide an adjustable mechanical advantage for the apparatus that facilitate the lifting of the wheel assembly, whether the pneumatic tire is inflated of deflated. The wheel engaging elements includes roller assemblies having adjustable effective radii which are mounted on framework arm members, the arm members being movable relative to one another. The actuator includes an adjustabe lever mechanism which is connected to the framework, and is capable of driving the roller assemblies against the tire of a wheel assembly located therebetween. As the rollers are driven against the tire, the wheel assembly is lifted, and the roller assemblies and apparatus framework are formed into a carriage for receiving and subsequently conveying the wheel assembly. In a first preferred embodiment, the roller assemblies are each formed by a plurality of roller elements arranged in a convex contour relative to the wheel assembly tire tread. The roller elements of each assembly are mounted in a housing that is itself pivotally mounted on the apparatus framework. In a second preferred embodiment, the roller assemblies are each formed by a plurality of nested roller elements which are rotatably mounted on the framework arm members.

12 Claims, 18 Drawing Figures

APPARATUS FOR JACKING AND DOLLYING AN AFFIXED VEHICLE WHEEL ASSEMBLY

BACKGROUND OF THE INVENTION

1. Field of the Invention

This invention concerns apparatus for jacking and dollying a vehicle wheel assembly while the assembly remains affixed to the vehicle; and more particularly, a jacking and dollying apparatus for use with a wheel assembly including a pneumatic tire, wheel and axle, the apparatus including wheel engaging means and an actuator; as for example, an adjustable roller assembly and a lever mechanism which cooperate to facilitate the lifting and conveying of the wheel assembly while it is affixed, and whether the pneumatic tire is inflated or deflated.

2. Description of Related Art

Movement of conventional vehicles in a confined spaces is difficult and inefficient at best, and can be impossible altogether. Because most cars and trucks are equipped with front wheel steering, a series of repeated backward and forward maneuvers is required to locate them in limited spaces, such as those found in repair garages or body shops. Further, on those occasions when size and geometry of the space is particularly limited, it may be impossible to position the vehicle as desired at all.

This problem arises from the inherent limitations associated with front wheel steering. As all drivers have found, front wheel steering, permits vehicle movement in only straight line and relatively broad arcuate paths. As a result, where right angle, rotational or shallow arcuate paths are desired, movement may not be possible unless sufficient space is provided to approximate those paths with a series of straight line and broad arc maneuvers.

Such space requirements can, however, be a luxury. In the case of a garage or body shop, providing sufficient space to accommodate front wheel steering may require servicing fewer vehicles, making the facility; i.e., floor space, larger, or some combination of the two. But, both accommodating fewer vehicles and providing larger space are costly. They entail either loss of operating revenue due to the reduced number of vehicles served, or additional capital outlay for construction of increased space.

The movement shortcomings associated with front wheel steering arise from the rstricted turning ability the vehicle wheels are provided with. Particularly, the vehicle front wheels are constrained to turn together, and only through a limited angle, while the back wheels can not be turned at all. However, if each of the vehicle wheels were free to swivel 360 degrees about its vertical axis; e.g., like a dolly caster, vehicle movement limitations would be eliminated. In fact, if the vehicle were placed on a dolly, the independent 360 degree swivel action afforded by the dolly casters would permit the vehicle to be moved at right angles, rotationally or through shallow arcuate paths as desired.

The complexity of providing a suitable dolly, and the loading and unloading of a vehicle to and from it, however, is not insignificant. To be successful, the dolly would have to have a capacity sufficient to sustain the vehicle's size and weight, and, as a result, would require costly and bulky construction. Further, means would have to be provided for getting the vehicle from the ground onto the dolly, and from the dolly back to the ground again. As can be imagined, where a hoist was used, it too would not be insignificant in size and cost.

An alternative to lifting the entire vehicle onto a single dolly would be to use individual jacking and dolly units placed at each vehicle wheel assembly. Use of individual units capable of both lifting the wheel assembly and carrying it, while affixed, would permit the wheel assembly to be raised from the ground, and once raised, effectively swiveled through 360 degrees by means of casters provided on the unit. With the wheel assembly so mounted, the vehicle could be moved at right angles, rotationally of through shallow arcuate paths as desired.

Further, use of individual units could provide substantial cost savings. The work required of individual units would be significantly less than that of a single large dolly. With individual units, only approximately a quarter of the vehicle's weight would have to be sustained, and none of its size; i.e., spanning between wheels would be eliminated. Accordingly, the bulk, complexity and cost of individual dolly units would be substantially less than that of a single dolly. Further, the need for a complex and costly vehicle hoist or jack would be eliminated.

But even in the case of individual units problems remain. In particular, if an individual unit is to be effective, not only should it combine, in a single apparatus, the ability to both lift the wheel assembly from the ground and, thereafter, transport it, but also, it should be flexible enough to accomodate the wide variety of vehicle wheel assembly sizes commonly found today. Further, because it is not uncommon for the tire of a wheel assembly to be flat, particularly in a garage or body shop, the unit must be able to lift the wheel assembly whether the tire is inflated or deflated. Still further, to be commercially attractive, the unit should be simply and quickly manipulated by a single operator. Further still, these results must be achieved with a structure whose bulk does not interfere with vehicle movement or whoes cost does not prohibit use.

While dollies have been proposed for removing a vehicle tire and wheel, and transporting them once removed, none have been proposed for the more difficult task of jacking and dollying the vehicle wheel assembly; i.e., jacking and dollying the combined tire, wheel and axle, while they remain affixed. In operation, tire and wheel dollies are used in conjunction with a separate jack. The separate jack is required to lift the vehicle axle so that the dolly may be positioned beneath the tire and wheel. But, use of a separate jack is unattractive because of the extra time and cost associated with it.

What jacking capacity these dollies do have is addressed to lifting the tire and wheel from the vehicle. They do not include means intended to lift the entire wheel assembly; i.e., tire, wheel and axle while affixed. Nor are they capable, typically, of lifting a deflated tire before it is raised from the ground by the separate jack. Additionally, these dollies tend to have awkward and slow acting mechanisms which don't lend themselves to quick, single motion manipulation by a operator. Further, typically, they have a size and configuration that would encumber movement of the vehicle once it was lifted.

For example, E. R. Carruthers in U.S. Pat. No. 2,380,415, issued Jul. 31, 1945, proposes a tire and wheel dolly suitable for handling truck dual rear whee. In accordance with the Carruthers design, a separate jack is needed to lift the truck axle, wheel and tires from the ground so that his apparatus can be rolled beneath. Thereafter, cradles provided on the apparatus are brought beneath and against the tires by means of a crank and screw mechanism to lift the tires and wheels from the axle. Accordingly, the Carruthers apparatus requires the undesirable step and equipment for separately lifting the wheel assembly before the apparaus can be used. Additionally, because of its design, the Carruthers apparatus would not be suitable for lifting deflated tires, the action and range of motion of the cradles being dissipated in deforming the deflated tire. Further, the Carruthers design is not susceptible of quick, single action manipulation.

Another proposed tire and wheel dolly is described by W. F. Gemmill in his U.S. Pat. No. 2,217,898, issued Oct. 15, 1940. Like the Carruthers apparatus, the Gemmill dolly also requires a separate jack for initially lifting a truck axle, wheels and tires. Once the wheel assembly has been raised, arms on the apparatus may be caused to engage the truck tires to lift them together with their wheels from the truck's axle. Accordingly, as in the case of Carruthers design, the Gemmill dolly requires the use of a separate jack with its associated shortcomings. Further, due to the nature of its jacking arrangement, the Gemmill apparatus has an especially bulky and complex mechanism, and would, therefore, not be suited for unencumbered movement of the vehicle or quick action.

Other and similar examples of tire and wheel dollies are found in U.S. Pat. Nos. 1,967,119; 2,170,607; 2,386,516; 2,410,902 and 3,836,027. However, as in the case of the Carruthers and Gemmill dollies, separate jacks are relied upon to lift the vehicle axle. Additionally, the bulk, complexity and nature of operation of these dollies would encumber vehicle movement and not be suited for simple and quick operation.

A jack has, however, been proposed by R. L. Foringer in U.S. Pat. No. 2,332,443 issued Oct. 19, 1943, which is capable of lifting and dollying circular bodies. But, the Foringer jack, as described, is designed for lifting rigid objects such as large metal tanks. The jack features rollers mounted on arms, the arms being coupled by a threaded shaft and nut assembly. By manipulating a pawl and handle which extends from the device, the nut assembly draws the arms and associated rollers against the tank side walls causing the tank to lift. While the Foringer jack would appear capable of lifting an inflated tire, it, however, would not be capable of lifting a deflated tire; the action of drawing the rollers against the tread being dissipated in the deformation of the deflated tire. Further, the pawl and handle arrangement are unsuited for providing quick, single action operation, and would encumbered movement of the vehicle.

SUMMARY OF THE INVENTION

It is, therefore, an object of this invention to provide an apparatus capable of jacking and dollying a vehicle wheel assembly, the assembly including a pneumatic tire, wheel and axle, while the assembly remains affixed to the vehicle.

It is a further object of this invention to provide an apparatus capable of jacking and dollying affixed vehicle wheel assemblies which are of varying size.

It is another object of this invention to provide an apparatus capable of jacking and dollying an affixed vehicle wheel assembly whether the pneumatic tire thereof is inflated or deflated.

It a still further object of this invention to provide an apparatus for jacking and dollying an affixed vehicle wheel assembly, which apparatus may be simply and quickly manipulated by an operator.

It is yet another object of this invention to provide an apparatus capable of jacking and dollying an affixed vehicle wheel assembly, which apparatus is sufficiently compact so as not to encumber vehicle movement.

And, it is a further object of this invention to provide an apparatus capable of jacking and dollying an affixed vehicle wheel assembly, which apparaus is of simple and low cost construction.

Briefly, the apparatus in accordance with this invention achieves the desired objects by featuring a framework that, upon apparatus manipulation, is formed into a carriage for receiving an affixed vehicle wheel assembly; i.e., pneumatic tire, a wheel and an axle, as the assembly is lifted. The apparatus also features wheel engaging means and an actuator which cooperate to provide a mechanical advantage capable of lifting the assembly onto the framework whether the wheel assembly tire is inflated or deflated.

In accordance with the invention, the framework is constituted by structural means including a body section having a first member slidably received in a second member. Additionally, the framework includes a first arm attached to the body section first member and a second arm attached to the body section second member. The framework arms are oriented to extend from the body section in a direction approximately orthogonal to the center line of the body section to form a generally "U" shaped structure.

Wheel engaging means are provided on the apparatus, the wheel engaging means including a first element mounted on the framework first arm and a second element mounted at the framework second arm.

As noted, the apparatus includes an actuator. The actuator in accordance with this invention is a simple, single action mechanism coupled to both the body section first and second members. When manipulated, the actuator forces the wheel engaging members against the tread of the pneumatic tire, the tire being positioned between the framework arm members. At least one of the members of the wheel engaging means includes a roller assembly that permits the pneumatic tire to ride onto the roller assembly, thereby lifting the wheel assembly as the wheel engaging means is forced against the tire. Simultaneously with the lifting of the wheel assembly, the framework is formed into a carriage for receiving the assembly. As the pneumatic tire rides onto the wheel engaging means, the framework body section members are drawn into one another and locked in position by the actuator, leaving the tire and remainder of the wheel assembly supported by the wheel engaging means, the arm members and body section. Transport means in the form of casters, or the like, are provided on the framework to permit subsequent dollying of the wheel assembly once it is supported on the framework.

In accordance with the invention, the effective diameter of the roller assemblies cooperates with the actuator to provide a mechanical advantage capable of lifting the wheel assembly; i.e. the pneumatic tire, wheel and axle. Further, the effective radii of the roller assemblies, in preferred form, are made adjustable so that various diameter wheel assemblies and vehicle weights may be accommodated and so that the wheel assembly may be lifted whether the pneumatic tire is inflated or deflated.

The actuator, in preferred form, includes a lever mechanism having a linkage element connected to the body section first member and a lever element connected to the body section second member. The lever element and linkage element are also connected to one another so that with a single movement of the lever, the first and second body section members may be drawn toward one another and the roller assemblies of the wheel engaging means forced against the pneumatic tire.

In a first preferred embodiment of the apparatus, each roller assembly of the engaging means is formed by a plurality of roller elements arranged in a convex arcuate contour relative to the wheel assembly tire tread. The roller elements are mounted in a housing that is itself pivotally mounted on the apparatus framework. The housing is arranged so that the effective radius of the assembly may be varied by pivoting the assembly toward the tire tread located between the framework arm members. An adjustable prop is provided for supporting each roller assembly in positions of varying effective radius.

In a second preferred embodiment of the invention, each engaging means roller assembly includes a plurality of nested roller elements, each element having an outside and inside contour dimensioned to be received in a subsequent roller element. In this arrangement, the effective radius of the assembly is defined by the effective radius of the outer-most roller, the effective radius being adjusted by substituting elements of different radius as the outer-most element. In this embodiment, the roller elements are mounted upon the framework arm members and are held in place by retainers. In preferred form, the rollers are cylindrical, however, they may be mounted off center or provided with a non-circular outer contours to assure ground clearance.

The foregoing and other objects, features and advantages of the invention will become apparent from the following more detailed description of its preferred embodiments, as illustrated in the accompanying figures.

DETAILED DESCRIPTION OF THE INVENTION

As noted, the limitations of front wheel steering render movement of conventional vehicles in limited spaces; e.g., those found in repair garages and body shops, difficult at best, and at worst, impossible. However, the space requirements of front wheel steering, particularly in garages and shops where the consequences are either servicing fewer vehicles or expending money to enlarge working area, can be overcome with use of a jacking and dollying apparatus placed at each vehicle wheel assembly.

With such an apparatus, each wheel assembly; i.e. pneumatic tire, wheel and axle, can, in effect, be swiveled 360 degrees about its vertical axis by means of casters provided on the apparatus. When set upon individual wheel dollies, the vehicle, therefore, can be moved at right angles, rotated or moved through shallow arcuate paths, and thus overcoming the restrictions of front wheel steering.

However, in order for this approach to be of commercial interest, the apparatus must meet a number of requirements. Particularly, the apparatus must be able to jack a wheel assembly from the ground, and carrying it thereafter while the assembly remains fixed to the vehicle; be able to life and carry the range of wheel assembly sizes and weights commonly found today; lift and carry the assembly whether the pneumatic tire is inflated of deflated; have a bulk and complexity which does not encumber vehicle movement or manufacturing cost; and be of a design that permits quick and simple operation.

While, as noted, dollies for removing and transporting vehicle tires and wheels have been proposed, they are unsuited for the procedure proposed here. Particularly, these dollies require use of auxiliary jacks to lift the vehicles so the dollies can be placed beneath the wheel assembly. Use of a separate jack, however, is undesirable, as it adds to cost and complexity. Additionally, prior art tire and wheel dollies typically are unsuited for lifting deflated tires from the ground. Further they have bulky mechanisms which would restrict vehicle movement and render the lifting operation slow and awkward.

While, as also noted, a jack has been proposed which is capable of lifting and dollying a circular rigid body; as for example a large tank, and, presumably, an inflated tire, it too is unacceptable. It is unacceptable because it is unable to lift deflated tires; because its actuator mechanism is large and bulky and would interfere with vehicle movement; and because its operation is not capable of simply and quickly raising the vehicle from the ground.

The apparatus of this invention overcomes the shortcomings of the prior art by providing a compact and simple mechanism capable of quickly jacking and dollying an affixed wheel assembly, whether inflated of deflated, and without either encumbering vehicle movement or apparatus manufacturing costs.

Figure 1:
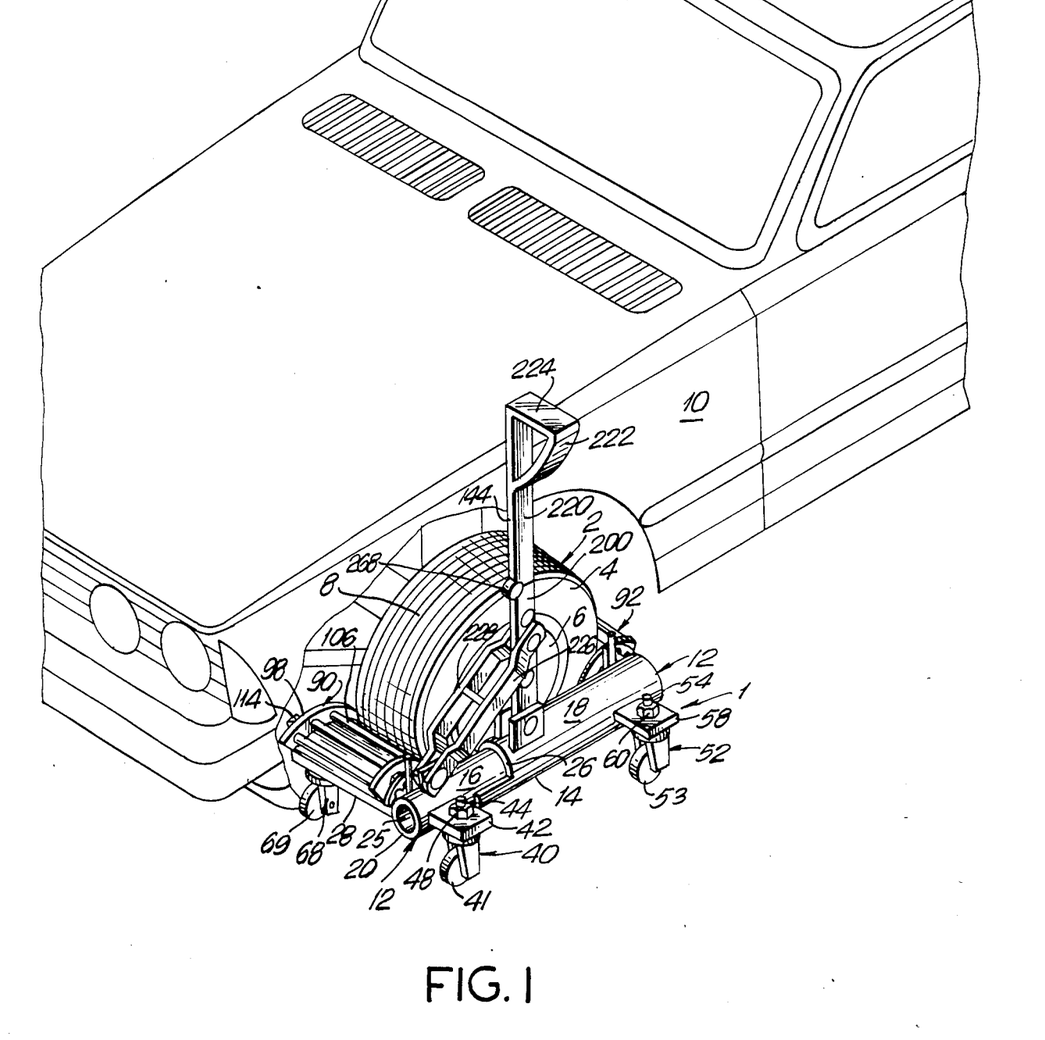
FIG. 1 is an isometric view of a first preferred embodiment of the apparatus in accordance with this invention shown together with a vehicle and its wheel assembly before actuation of the apparatus.

The jacking and dollying apparatus of this invention is shown in a first preferred embodiment in FIGS. 1 to 9. As seen in FIG. 1, the apparatus 1 may be positioned compactly about a wheel assembly 2 of a vehicle 10.

Figure 2:
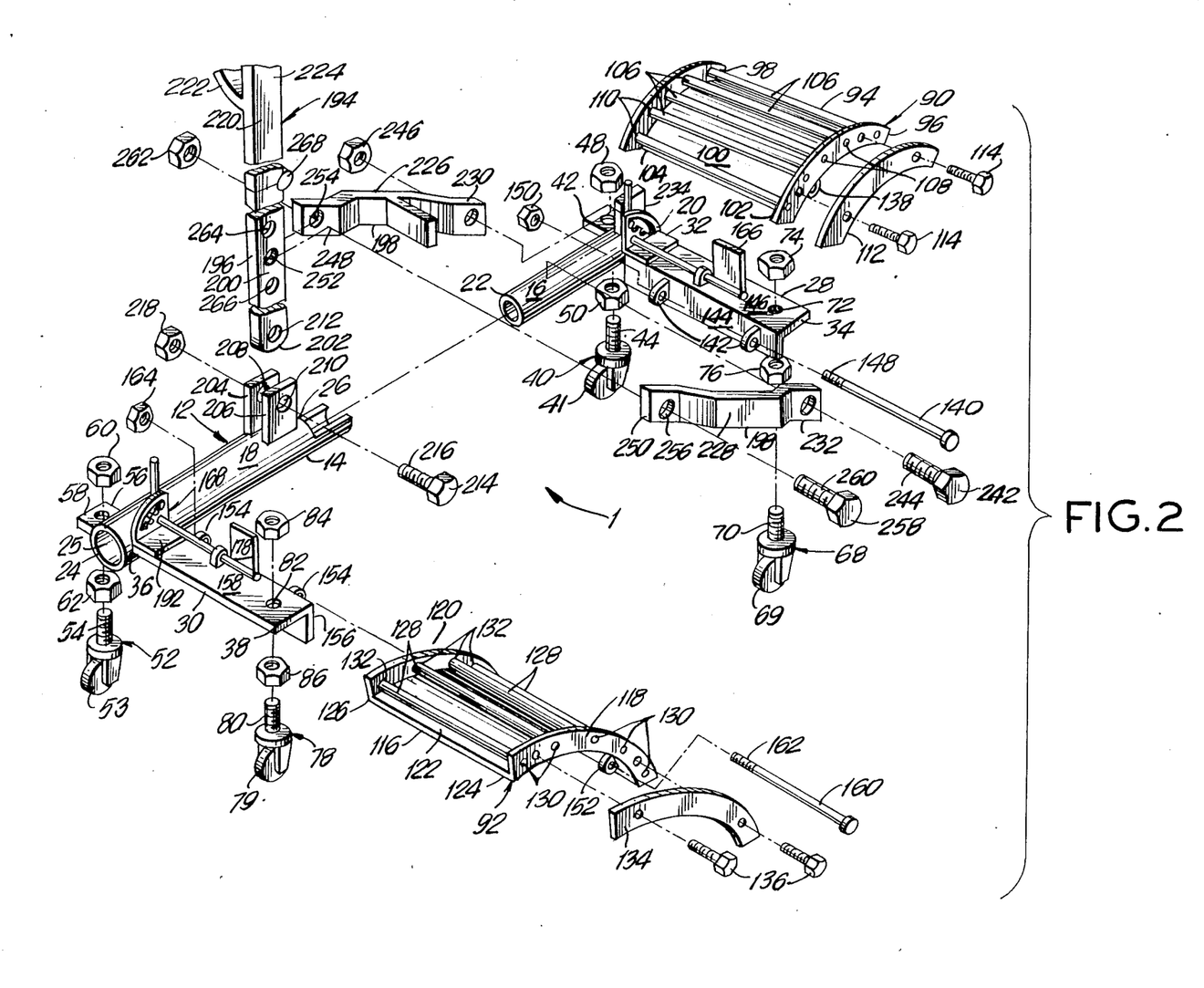
FIG. 2 is an exploded isometric view of a first preferred embodiment of the apparatus in accordance with this invention.

As shown in FIG. 2, apparatus 1 features a framework 12 having a body section 14 and two arm members 28 and 30 attached thereto. Body section 12 together with arm member 28 and 30 form a generally "U" shaped frame structure. Framework 12 is provided with transport means in the form of caster assemblies 40, 52, 68 and 78 mounted on the framework to facilitate movement of the apparatus as desired.

Apparatus 1 also includes wheel engaging means in the form of roller assemblies 90 and 92 mounted on framework arms 28 and 30 respectively. Roller assemblies 90 and 92 are arranges to engage wheel assembly tire 4 about which apparatus 1 may be positioned as best seen in FIG. 1.

Additionally, apparatus 1 also includes an actuator attached to framework body sections 16 and 18. In the preferred form shown in FIG. 2, the actuator is a lever mechanism 194 having a lever element 196 and a linkage element 198. Lever element 196 is provided with a handle 222 at end 224, and is pivotally connected to body section 18 at end 202. Linkage element 198 is pivotally connected at end 230, 232 to body section member 16, and at end 248, 250 to lever element 196. Linkage element 198 is connected to lever element 196 at bore hole 252 a predetermined distance from lever element end 202. This distance may be varied by connecting element 198 above or below bore 252; as for example, at bore hole 264 or 266 which may be provided on lever element 196, as will be described further hereafter.

When handle 222 is pulled, body section members 16 and 18 are drawn together, and roller assemblies 90 and 92 are driven against tread 8 at corresponding points on opposite sides of tire 4. As best seem in FIGS. 5 and 6, when roller assemblies 90 and 92 are driven against tire 4, forces are exerted on the tire which cause wheel assembly 2; i.e., tire 4, wheel 6 and axle 5, to rise from the ground, and tire 4 to ride over roller assemblies 90 and 92. During this process, roller assemblies 90 and 92, together with framework 12, are formed into a carriage for receiving and retaining the wheel assembly. Thereafter, wheel assembly 2 is free to be dollied as desired by caster assemblies 40, 52, 68 and 78.

Figure 6:
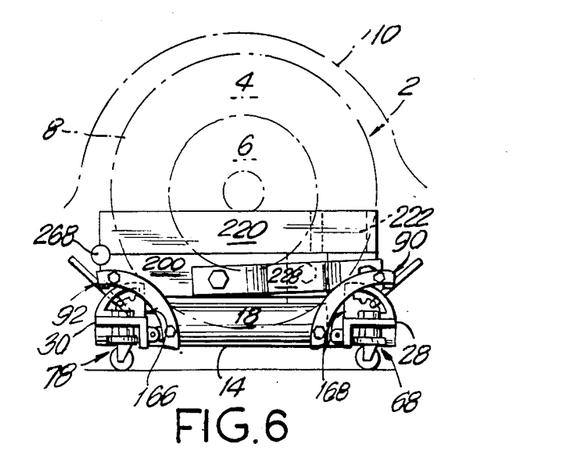
FIG. 6 is a front elevation view of a first preferred embodiment of the apparatus in accordance with this invention together with a wheel assembly after actuation of the apparatus.

As noted, prior art devices are unsuited for this process because of their bulk, complexity and, in some cases, need for an auxiliary jack. In accordance with this invention, the apparatus is designed to provide simple and quick action, and not to encumber vehicle movement once the wheel assembly is raised. Particularly, lever mechanism 194, in combination with roller assemblies 90 and 92, is capable of initiating lift with a single movement of handle 222. Further, integration of lever mechanism 196 with body section 14 permits the mechanism to function and thereafter collapse into conformity with the framework as shown in FIG. 6. This operation thus avoids any overhanging or bulky mechanism which would encumber subsequent movement of the vehicle. As would be appreciated by those skilled in the art, while in accordance with this invention the described lever mechanism is preferred, any actuator capable of providing quick and simple action which may also be integrated with the framework is acceptable.

However, simple and compact actuator operation creates other problems. Particularly, the lever mechanism has a limited range of mechanical advantage. As is well known, mechanical advantage can be defined as the ratio of the distance over which the input force is applied to the distance over which the output force is available. Here, the input force is applied at the lever mechanism handle over a distance equal to the arc length defined by the length of the lever times the angle of movement about its pivot. Further, and assuming the lever has approximately a 180 degree range of motion; i.e., from horizontal to horizontal, the output force is available over a distance equal to the distance from the lever pivot point to the point of attachment of the linkage element times one minus the cosine of the angle of movement. Accordingly, the mechanical advantage of lever mechanism can be expressed as:

$$MA_L = H \times O \,/\, K \times (1 - \text{Cosine } O),$$

where $MA_L$ is the mechanical advantage of the lever mechanism, H the length of the lever, K the distance from the lever pivot to the point of linkage attachment on the lever and 0 the angle of lever movement as measured from the horizontal.

Since to be practical, lever element 196 should be limited to a length that can be conveniently manipulated by an operator, and since the angle of handle movement should also be limited to facilitate quick action; e.g., 180 degrees or less, the input force distance is, accordingly, limited. Further, because at least sufficient output travel is required to permit roller assemblies 90 and 92 to lift wheel assembly 2, the degree to which the output distance can be reduced is limited. Accordingly, the price of the quick and simple apparatus operation is an actuator mechanical advantage which may be limited.

However, in accordance with this invention, the mechanical advantage of the lever mechanism is supplemented with the mechanical advantage provided by roller assemblies 90 and 92. As in the case of the lever mechanism, the mechanical advantage of the roller assemblies can be defined as the ratio of the distance over which the input force is applied, to the distance over which the output force is available; i.e., the distance of roller assembly travel divided by the height of wheel assembly lift.

As will be appreciated by those skilled in the art, the amount of roller assemblies travel required to produce a particular amount of lift is determined by the effective radii of the roller assemblies and the radius of the wheel assembly. This relationship can be demonstrated with a simple graphic.

Figure 10A:
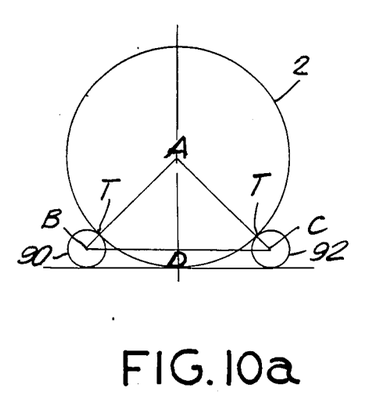
FIGS. 10a and 10b are schematic side elevation views of the wheel engaging means roller assemblies in accordance with this invention together with a wheel assembly showing the roller and wheel assemblies, respectively, before and after wheel assembly lift.

As shown schematically in FIG. 10a, where roller assemblies 90 and 92 are placed as close to the center line of wheel assembly 4 as possible, they contact wheel assembly 2 at points T. In this position, two right triangles, ABD and ACD, each including a roller assembly, can be defined. Since the triangles are similar, only one need be discussed. With regard to triangle ABD, leg BD represents the distance from the center line of wheel assembly 2 to the effective center of roller assembly 90; leg AD the difference between the radius of the wheel assembly and the effective radius of the roller assembly, and hypotenuse AB the sum of the wheel assembly radius and the effective radius of the roller assembly. Of particular interest is leg BD; it represents the potential maximum travel of roller assembly 90. Using simple trigonometry, it can be shown that leg BD is equal to twice the square root of the wheel assembly radius times the effective radius of the roller assembly.

Figure 10B:
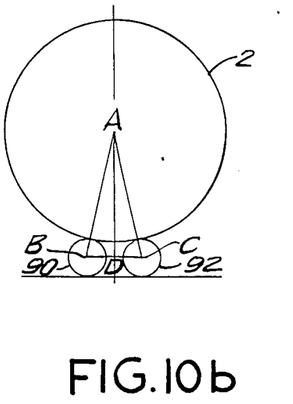

Further, and as shown in FIG. 10b, where roller assembly 90 is driven towards the wheel assembly center line; i.e., point D, the lift at maximum travel approaches the effective diameter; i.e., twice the effective radius, of roller assembly 90. while attainment of point D is not possible in practice because of the presence of roller assembly 92, the approximation of maximum lift as twice the effective radius of roller assembly 90 is acceptable for purposes of analysis.

Based on the above, the mechanical advantage provided by the roller assemblies at maximum travel can be approximated as:

$$MA_r = 4 \times R^{\frac{1}{2}} \times r^{\frac{1}{2}}/2 \times r = 2 \times R^{\frac{1}{2}}/r^{\frac{1}{2}},$$

where $MA_r$ is the mechanical advantage provided by the roller assemblies, R the radius of the wheel assembly and r the effective radius of the roller assembly. Since the mechanicl advantage for the apparaus is the product of the mechanical advantage for the lever mechanism and the roller assemblies, and assuming for the purposes of analysis the angle of lever displacement is 90 degrees, the mechanical advantage for the apparatus where full roller travel is provided may be approximated as:

$$MA_A = \times H \times R^{\frac{1}{2}}/ K \times r^{\frac{1}{2}}.$$

As suggested by this expression, mechanical advantage at maximum roller travel may be increased by simply reducing the effective radius of the roller assembly to the smallest that can be used to produce an acceptable lift; maximum lift, as noted, being twice the effective roller radius. However, use of a smaller roller radius creates problems. For example, while reduction of roller assembly radius will increase mechanical advantage, it makes the lifting of deflated tires difficult or impossible. If the wheel assembly tire is under inflated. the action of a smaller radius roller is dissipated in deforming the tire casing during attempted lift. Particularly, the travel of the rollers is exhausted in the casing before the roller can produce lift. Additionally, the wrinkled tire casing can clog the roller mechanism, and prevent full travel from being realized. This condition is, of course, aggravated to the point of preventing apparatus operation where the tire is flat.

Further, where the roller size is set to optimize mechanical advantage for a particular tire size, subsequent increases in tire size; e.g., where the apparatus is required to handle a larger wheel assembly, will require additional roller travel in order to produce the same amount of lift. This additional travel, however, may not be conveniently available from the lever mechanism. Still further, if tire size is reduced; as for example where the apparatus is required to handle a smaller wheel assembly, it may be desirable to increase roller radius.

To permit the lifting of deflated tires, and to compensate the effects associated wih varying wheel assembly size, the apparatus in accordance with this invention includes roller assemblies having adjustable effective radii. Particularly, and as shown in a first preferred embodiment in FIG. 2, roller assemblies 90 and 92 are, respectively, comprised of a plurality of roller elements 106 and 128 mounted in arcuate housings 94 and 116 which are pivotally mounted on framework arm members 28 and 30. As shown, the arcuate housings 94 and 116 are oriented convexly relative to the wheel assembly to be engaged. Further, assemblies 90 and 92 are provided with support means in the form of adjustable prop assemblies 166 and 168 so the roller assemblies may be set to various effective radii as best seen for assembly 92 in FIGS. 7a, 7b and 7c.

With reference to FIG. 10a, it should be appreciated that where effective roller radius is increased for a particular wheel assembly radius; e.g., where added lift is desired, not only are the roller assemblies displaced from the wheel center line, mandating a larger amount of roller travel, but, the angle of applied force; i.e. angle ABD; the angle hypotenuse AB makes with the horizontal, is decreased. This causes a reduction in the component of lift force initially available. Thus, increasing roller effective radius for a particular wheel assembly radius has the effect of increasing the amount of force which must be applied to initiate lift. To assure practicality, the amount of force required to initiate lift must be maintained within the limits of force that may reasonably be applied at handle 222.

As will also be appreciated by those skilled in the art, where wheel assembly radius is varied, the attachment point 252 of linkage element 198 to lever element 196 may also be adjusted along with the roller assembly, based on the above discussion, to produce a desired lift and mechanical advantage. As noted, the distance of linkage attachment can be adjusted by varying the point of attachment; e.g. hole 252, 264, 266.

Figure 7A:
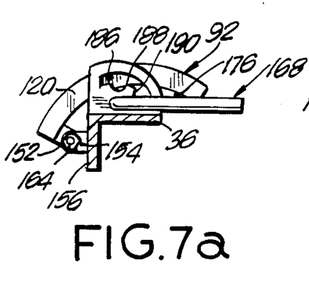
FIGS. 7a, 7b, 7c are section views of a first preferred embodiment of the apparatus framework in accordance with this invention showing a wheel engaging means roller assembly in three different effective diameter positions.
Figure 7B:
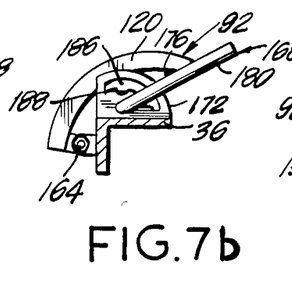
Figure 7C:
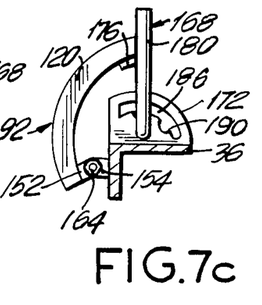

In the case of a deflated tire, roller assembly 90 and 92 would be set for the largest effective radius; e.g., as shown in FIG. 7c for assembly 92. In this configuration, the increased effective diameter of roller assemblies 90 and 92 compensate for the reduced wheel assembly radius occasioned by tire 4 being deflated. Further, as assemblies 90 and 92 are driven against tire 4, the wrinkled tire casing is caused to ride over roller elements 106 and 128, thereby avoiding clogging.

In a second preferred embodiment shown in FIGS. 11 to 15, where elements similar to those described in connection with the first preferred embodiment are referred to with like numbers, roller assemblies 90 and 92 are each comprised of a plurality of cylindrical roller elements 300, 330, which are coaxially and rotatably mounted at framework arm member 28 and 30 respectively. As seen, successive roller elements have successively larger outer diameters and are mounted one over the other. Removable retainer assemblies 302, 332, are provided at ends 34, 38, respectively, of arm members 28 an 30 to permit rotation while retaining the elements on the arms.

As in the case of the embodiment shown in FIG. 2, where the radius of wheel assembly 2 is varied, the effective radius of the roller assembly may be varied by successively removing or adding roller elements of appropriate radius. Where tire 4 is deflated, the largest effective radius element is provided at the roller assemblies. This is accomplished by simply removing retainer assemblies 302, 332, and configuring the roller assemblies with the outer most elements having the largest available radii, and replacing the retainers.

Because both the roller assembly and the lever mechanism are adjustable, a wide range of mechanical advantages, lifts and wheel assembly sizes can be accommodated while maintaining compact and quick apparatus operation. As will be apreciated, while adjustable roller assemblies are preferred, it would be possible to realize the compactness and speed of operation afforded by this design with fixed roller assemblies optimized for a particular application; e.g., wheel assembly size and weight.

In practice, for a wheel assembly radius of from approximately 10 to 15 inches, which correspond to 13 to 15 inch wheels commonly found on today's passenger cars, and for a lever angle of movement of approximately 90 degrees, the apparatus lever length would range from approximately 30 to 45 inches; the attachment point of the linkage element from approximately 15 to 25 inches above the lever pivot; and the effective roller radius from 1 to 4 inches.

Considering the apparatus in accordance with this invention in greater detail, and with reference to FIG. 2, in the first preferred embodiment, apparatus 1 features a framework 12 having a number of structural components. Particularly, framework 12 includes a body section 14 having a first member 16 received in a second body section member 18. In preferred form, member 16 is cylindrical having a first end 20 and a second end 22. Similarly, member 18 in preferred form is also cylindrical, and has a first end 24 and a second end 26. Member 18 is also provided with an internal cavity 25. Member 16 is axially aligned with second member 18, and dimensioned radially such that second end 22 is slidably received in cavity 25 at second end 26 of member 18.

Continuing with reference to FIG. 2, framework 12 is seen to also include a first arm member 28 and a second arm member 30. First arm member 28 has a first end 32 and a second end 34. As shown, arm member end 32 is affixed laterally of body section member 16 at end 20. Similarly, arm member 30 has a first end 36 and a second end 38; first end 36 being affixed laterally of body section member 18 at end 24. In this form of the invention, members 28 and 30 are angular sections, each, respectively, having a top face 146, 158, and a front face 144, 156.

Arm members 28 and 30 are approximately parallel, and are oriented approximately orthogonally to the center line of body section 14. Further, arm members 28 and 30 extend from section 14 in the same direction with front faces 144 and 158, respectively, in opposition, to form, with section 14, a generally "U" shaped framework 12.

Apparatus 1 is seen to include transport means in the form of four caster assemblies mounted to framework 12. In preferred form, the caster assemblies are located to uniformly distribute the weight of the apparatus and any load it may be carrying. Particularly, a first caster assembly 40 having a wheel 41 is affixed to a tab 42. Tab 42 extends laterally from body member 16 at end 20. A caster threaded shaft 44 extends through a hole 46 in tab 32, and is fixed in position by means of nuts 48 and 50 respectively. As will be appreciated by those skilled in the art, the height of body section 16 may be adjusted by adjusting nuts 48 and 50 on shaft 44.

Likewise, a caster assembly 52 having a wheel 53 is provided at end 24 of body section second member 18. As in the case of caster assembly 40, caster assembly 52 has a threaded shaft 54 which is receives through a mounting hole 56 in a tab 58. Tab 58 extends laterally from member 18 at end 24. Nuts 60 and 62 are provided at shaft 54 to permit height adjustment, and to secure caster assembly 52 to framework 12.

Continuing with reference to FIG. 2, caster assemblies 68 and 78 having wheels 69 and 79, are mounted at framework arm member 28 and 30, respectively. Threaded shaft 70 of assembly 68 is receives in a mounting hole 72 provided at end 34 of arm member 28. Nuts 74 and 76 permit height adjustment of frame arm 28, and secure the caster to framework 12. Shaft 80 of caster assembly 78 is likewise received in a mounting hole 82 provided in arm member 30 at end 38, and is secured in place by nuts 84 and 86 which further permit height adjustment of arm 30.

Height adjustment can be made uniformly at all caster assemblies, or individually at each assembly as desired. In use, it may be desirable to reduce the height of the roller assemblies, in order to increase the angle of initial roller and tire contact; e.g., angle ABD shown in FIG. 10a. As suggested above, the greater angle ABD, the greater the initial component of lift force.

Figure 5:
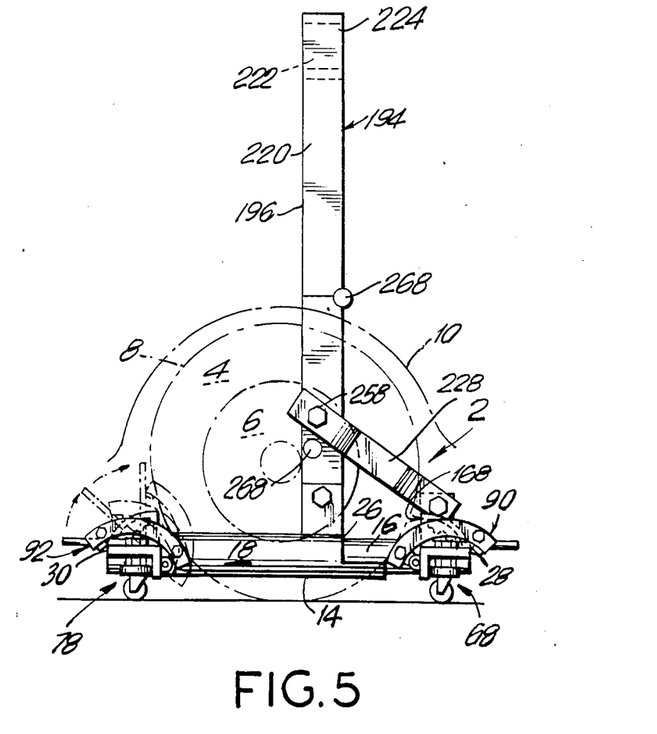
FIG. 5 is a front elevation view of a first preferred embodiment of the apparatus in accordance with this invention together with a wheel assembly before actuation of the apparatus.

As noted, apparatus 1 also includes means for engaging vehicle wheel assembly 2. With reference to FIG. 2, the wheel engaging means includes a first element mounted on framework arm member 28 and a second element mounted on arm member 30. The first element and second element are, in preferred form, substantaily similar, and are comprised of roller assemblies 90 and 92 respectively. As best seen in FIG. 5, roller assembly 90 and 92 are arranged to be forced against tread face 8 of tire 4 when apparatus 1 is activated as previously described. As will be appreciated, it would be sufficient if only one of the wheel engaging elements were a roller assembly. The other; for example, could be a simple stop, such as a bar, capable, when combined with the roller assembly, of forming a cradle for receiving wheel assembly 2.

Also in accordance with this invention, and as described above, roller assemblies 90 and 92 are designed to accommodate a range of tire sizes, and further, to transport the wrinkled casing of a deflated tire without clogging. As seen in FIG. 2, roller assembly 90 includes a housing 94 having a first end plate 96 and a second end plate 98. Plates 96 and 98 are mounted on a backing plate 100 at backing plate ends 102 and 104, respectively. Additionally, assembly 90 includes a plurality of roller elements 106 rotatably mounted in end plates 96 and 98. Roller elements 106 are journaled in bore holes 108 and 110 provided in plates 96 and 98, respectively. While bore holes 100 extend through plate 96, bore holes 110 extend only a predetermined depth into plate 98. With this arrangement roller elements 106 may be readily loaded into housing 94 and retained there by sliding them through plate 96 and into plate 98. A thrust plate 112 mounted on plate 96 with bolts 114, maintains roller elements 106 in housing 94. Bore holes 108 and 110 may be provided with bushings, bearings or the like, to improve movement of the roller elements.

Second roller assembly 92 is substantially the same as assembly 90, and likewise includes a housing 116 having end plates 118 and 120 mounted on a backing plate 122 at backing plate ends 124 and 126, respectively. Roller elements 128 are journaled in bore holes 130 and 132 as described in connection with assembly 90, and a thrust plate 134, held in place by bolts 136, retains roller elements 128 in the housing.

In accordance with this invention, and as noted above, in preferred form, roller assemblies 90 and 92 are adjustably mounted to framework 12 to complement operation of the apparatus actuator. With respect to roller assembly 90, and as seen in FIG. 2, backing plate 100 is provided with hinge tabs 138 at its rear face. Additionally, hinge tabs 142 are provided on front face 144 of framework arm member 28. A hinge pin 140 is provided for rotatably mounting roller assembly tabs 138 to arm member tabs 140, thereby adjustable mounting roller assembly 90 to framework member 28. A thread and nut combination, 148 and 150, respectively, is provided at pin 140 to secure it in place. As would be appreciated, equivalent means would be equally suitable.

In a similar fashion, roller assembly 92 includes hinge tabs 152 at the rear face of plate 122, and arm member 30 includes tabs 154 at face 156. A hinge pin 160 is provided to rotatably mount tabs 152 to tabs 154, and, thereby, pivotally mount assembly 92 to framework member 30. Like hinge pin 140, pin 160 is provided with a securing thread and nut 162 and 164, respectively, or the equivalent.

Figure 3:
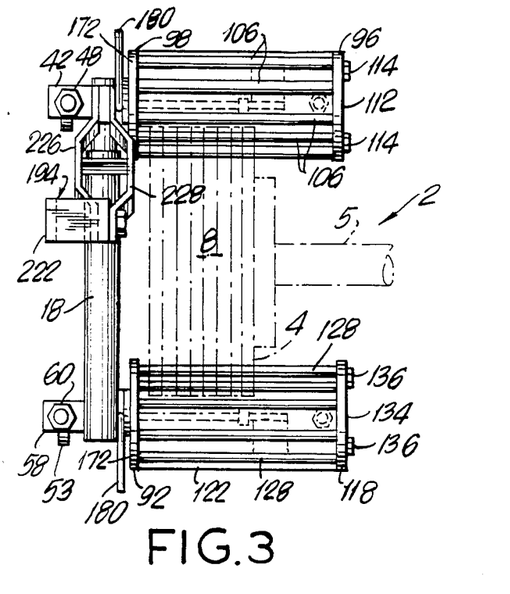
FIG. 3 is a plan view of a first preferred embodiment of the apparatus in accordance with this invention shown together with a wheel assembly before actuation of the apparatus.
Figure 4:
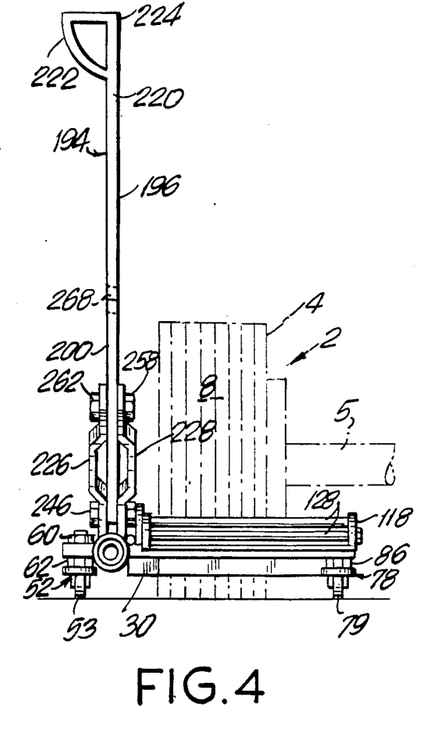
FIG. 4 is a side elevation view of a first preferred embodiment of the apparatus in accordance with this invention together with a wheel assembly before actuation of the apparatus.

Continuing with reference to FIG. 2, roller assembly housings 94 and 116 are both seen to have convex arcuate shapes, and be mounted with their major axis approximataly parallel to the major axis of their respective arm member. Additionally, roller elements 106 and 128 are arranged with their major axes parallel to that of their respective housing, and successively in a convex arcuate contour which follows the housing shape. Further, the housings and associated roller elements are oriented relative to tire 4 such that the convex contour of the roller elements engages the tire tread with the major axes of the elements parallel to the plane of the tread as the tire is lifted as best seen in FIGS. 3 and 6. This configuration allows wheel assembly tire 4 to ride onto and over the roller elements as the wheel assembly is lifted. Further, this arrangement is of particular advantage where tire 4 is deflated, since the forces arising during lift can be distributed over the wrinkled tire casing and the casing smoothed as the assemblies are formed into the carriage for retaining the tire and the rest of the wheel assembly.

Figure 8:
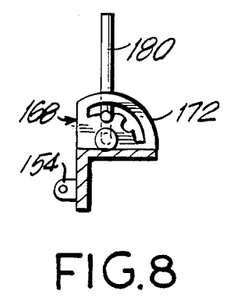
FIG. 8 is a section view of a first preferred ebodiment of the apparatus framework in accordance with this invention showing a portion of a wheel engaging means roller assembly.
Figure 9:
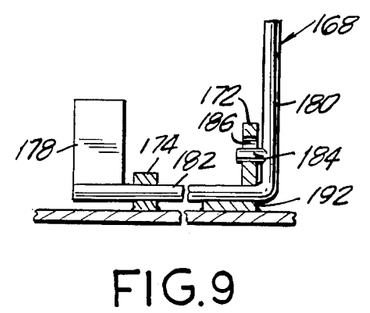
FIG. 9 is a section view of a portion of a wheel engaging means roller assembly in accordance with a first preferred embodiment of this invention taken along line 9—9 of FIG. 8.

It will be appreciated that any convenient means for maintaining the roller assemblies in positions that define the various effective roller assembly radii is acceptable. However, in preferred form, apparatus 1 includes adjustable prop assemblies 166 and 168 to support, respectively, roller assembly housing 94 and 116 in these positions. As seen in FIGS. 8 and 9, prop assembly 168 includes a prop element 170, a guide plate 172 and a support tab 174. Prop element 170 is rotatably mounted in tab 174 and plate 174, and may be locked in number of angular positoins as best seen in FIGS. 7a, 7b and 7c. In the various positions, prop element 170 cooperates with a stop 176 located on the back of plate 122 of support housing 116. As best seen in FIG. 9, prop element 170 includes a stand section 178, a lever arm 180, a shaft 182 and a support stud 184. Shaft 182 is journaled in support tab 174 and guide plate 172, and connects stand section 178 with lever arm 180. Prop element support stud 184 is fixed to lever 180 and extends at approximately a right angle into guide plate 172. In guide plate 172, stud 184 is received in an arcuate guideway 186. In guideway 186, stud 184 is free to drop into support notches 188 or 190 provided at the lower edge of the guideway. The bore 192 in plate 172 for receiving shaft 182 is made oversize so that by manipulation of lever 180, sud 184 may be moved between notches 188 and 190 to define the various different effective radii positions for the roller assembly. As will be appreciated, while only three positions have been shown; e.g. notches 188, 190 and the guideway base, as many positions as can be accommodated in the guide plate can be provided for.

Continuing with reference to FIG. 9, tab 174 is affixed in any convenient manner to the upper face 158 of framework arm member 30. Further, guide plate 172 is provided with a flange 192 which is also fixed in any convenient manner to face 158 of arm member 30.

Prop assembly 166 is substantially identical to assembly 168 in structure and function, and need not be further describer here.

As can best be seen in FIGS. 7a, 7b and 7c, by pivoting the roller assembly about its hinge pin, the assembly establishes successive contours which approximate rollers or varying radius tha might be mounted at the framework support arm, and thus establish the various effective radii noted. The consequences of these variations are as described above.

The actuator of apparatus 1 is shown in detail in FIG. 2. As seen there, it is connected to framework 12 for driving roller assembly 90 and 92 into engagement with wheel assembly 2. the actuator in preferred form is comprised of a lever mechanism 194 having a lever element 196 and a linkage element 198. Lever element 196 includes a lower segment 200 having an end 202 pivotally mounted to the upper side of member 18 proximate end 26. Two mounting tabs 204 and 206 are provided in spaced, side-by-side relation at the upper side of member 18 for receiving lever lower segment end 202 therebetween. Tabs 204, 206 and lever end 202 are provided with bore holes 208, 210 and 212, respectively, for receiving a bolt 214. Bolt 214 is provided with a thread 216 at the end thereof and nut 218 for securing the bolt in place. With this arrangement, lever element 196 may be pivoted about tabs 204 and 206 in a plane parallel to the axis of framework body section 14. Lever element 196 also includes an upper segment 220 having a handle 222 at segment end 224.

Linkage element 198, in the preferred form shown in FIG. 2, includes an outer segment 226 and an inner segment 228. At its lower end, defined by lower ends 230 and 231 of segments 226 and 228. respectively, linkage element 198 is pivotally mounted to a tab 234 provided on the upper side of body section member 16 at end 20. Tab 234 and linkage element segment ends 230 and 232 are provided with bore holes 236, 238 and 240, respectively, for receiving a bolt 242. Bolt 242 is secured in place by means of thread 244 at the end thereof and nut 244. At its upper end, defined by upper ends 248 and 250, respectively, of segments 226 and 228, linkage element 198 is pivotally mounted to lever lower segment 200. Lever segment 200 and linkage segment ends 248 and 250 are provided with bore holes 252, 254 and 256, respectively, for receiving a bolt 258 which is secured in place by a thread 260 at the end thereof, and a nut 262.

In accordance with this invention, lever segment bore hole 252 is located a predetermined distance from the lever element mount end 202 to define the mechanical advantage of the lever mechanism as described above. To facilitate variability of the lever mechanism mechanical advantage, lever segment 200 is provided with additional bore holes; e.g., 264 and 266, at greater and lesser distances from lever segment end 202. As will be appreciated, additional holes may be provided to vary lever mechanism mechanical advantage as desired.

Also in accordance with this invention, lever element upper and lower segments 200 and 220, respectively, are connected to each other by a hinge 268 so that the lever element may be conveniently located on the upper side of the apparatus body section 14 as best seen in FIG. 6. This collapsibility of the lever element facilitates a compactness of the mechanism that enables the unencumbered movement of the vehicle once mounted on the apparatus.

While not shown, apparatus 1 may be provided with linkage elements segments 226 and 228 which are adjustable in length to accommodate the spanning of large diameter as well as small diameter wheel assemblies. As noted, it is the distance of the linkage element mount point; e.g., 252, from lever pivot 202 that affects lever mechanical advantage, and not the length of linkage segments 226 and 228. Additionally, it should also be appreciated that the linkage element can take any convenient form, including single segment elements.

Also in accordance with this invention, the pivot 210 of lever element 194 is located at a higher point above body section 18 than the pivot 236 of linkage element 198. This assures a slight divergence of the framework arm members when the lever mechanism is fully actuated; i.e., lever element segment 220 and linkage element 228 are disposed at respective angles below a line tat extends from the center of pivot 210 to the center of pivot 236 when the wheel assembly has been lifted. The divergence establishes a force which serves to lock the lever mechanism in the raised position so further restraint of the lever is not required. When it is desired to return the wheel assembly to ground level, a simple pull on the lever handle releases the mecanism; i.e., brings the lever above the horizontal, so that the weight of the wheel assembly can force arm members 28 and 30 apart as the wheel returns to ground level.

In operation, apparatus 1 is positioned about a wheel assembly 2 with roller assemblies 90 and 92 abutting tire tread 8. As noted, linkage element segments 226 and 227 may be made adjustable so that lever mechanism 194 can be oriented vertically when the apparatus is to be acutated regardless of the size of the wheel assembly. While vertical orientation of the lever element reduces the range of motion of the lever mechanism to 90 degrees, the operator convenience which results can make the reduction worthwhile. Further, the consequences of range of motion reduction can, within limits as noted above, be offset with changes to the point of attachment of the linkage element to the lever and variation of roller assemblies effective radii.

Following positioning, the roller assemblies, props and linkage attachment point are adjusted to suit the wheel assembly to be lifted. For example, where the wheel diameter is large and the assembly heavy, the effective radius of the roller assembly and the length of the linkage attachment point may be reduced to provide the appropriate mechanical advantage and roller travel for the load. Where the wheel size and weight, on the other hand, are reduced, the roller assembly and linkage attachment point can be increased to provide the mechanical advantage and roller travel most suited to convenient handling of the load.

Still further, where the wheel assembly tire is deflated, the roller assembly effective radius and the linkage point may be set to maximum in order to compensate for the reduction in wheel assembly radius caused by the deflated tire, and to assure there is sufficient travel for the rollers to act.

Thereafter, force is applied to handle 222 to drive roller assemblies 90 and 92 into engagement with tread 8. This causes the tire to lift and the roller assemblies with arm members 28 and 30 to drive under the wheel assembly as apparatus 1 is formed into a carriage for retaining wheel assembly 2. As noted, lever pivot 202 is set at higher point above framework body section 18 than the linkage attachment to the body section so that the body sections members 16 and 18 separate slightly on full acutation of lever element 196. This locks the apparatus in the activated position, and the vehicle may, subsequently, be transported as desired.

Figure 11:
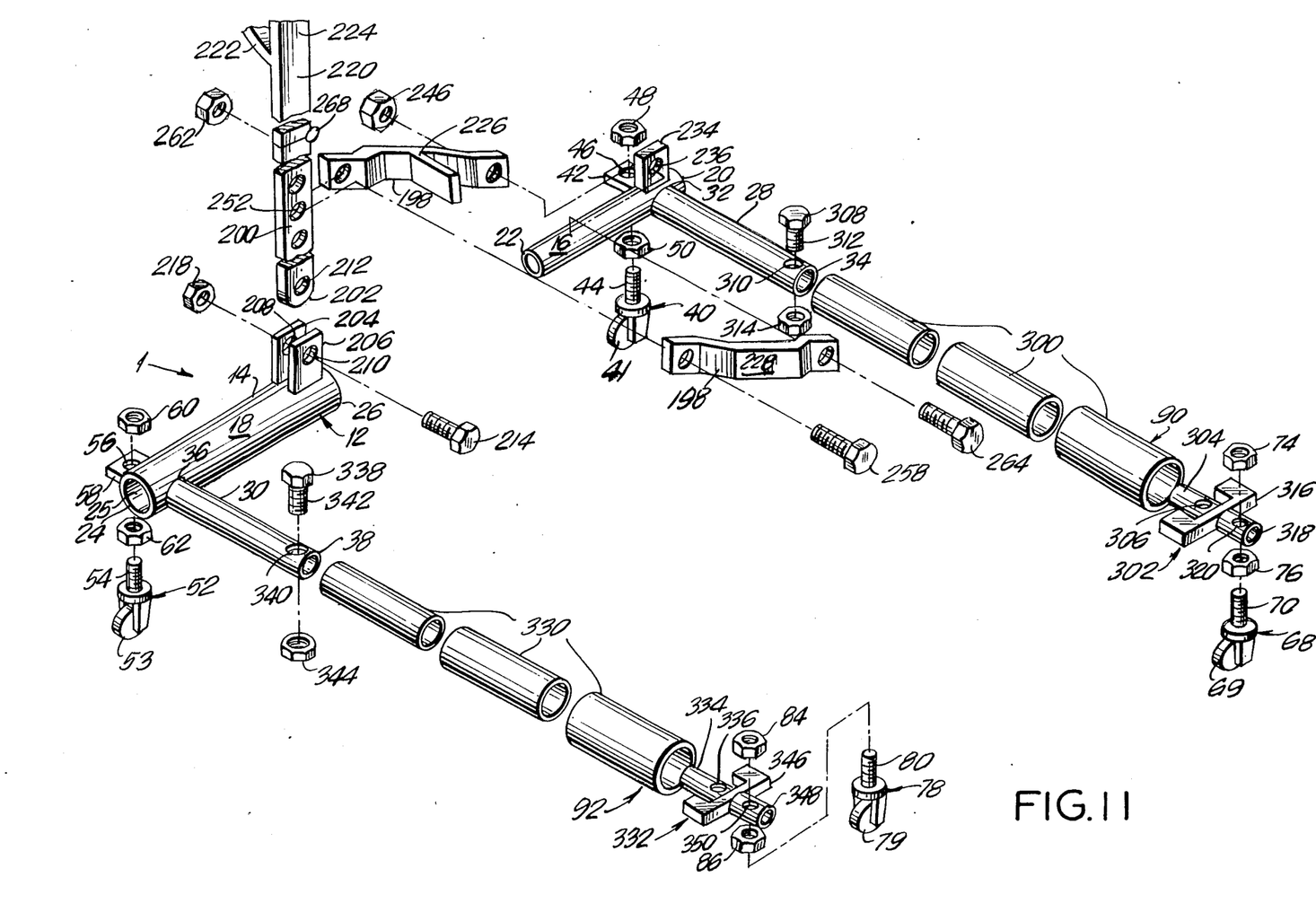
FIG. 11 is an exploded isometric view of a second preferred embodiment of the apparatus in accordance with this invention.
Figure 12:
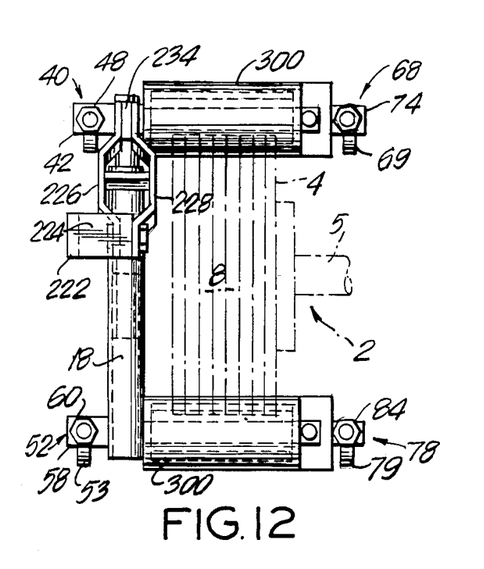
FIG. 12 is a plan view of a second preferred embodiment of the apparatus in accordance with this invention shown together with a wheel assembly before actuation of the apparatus.
Figure 13:
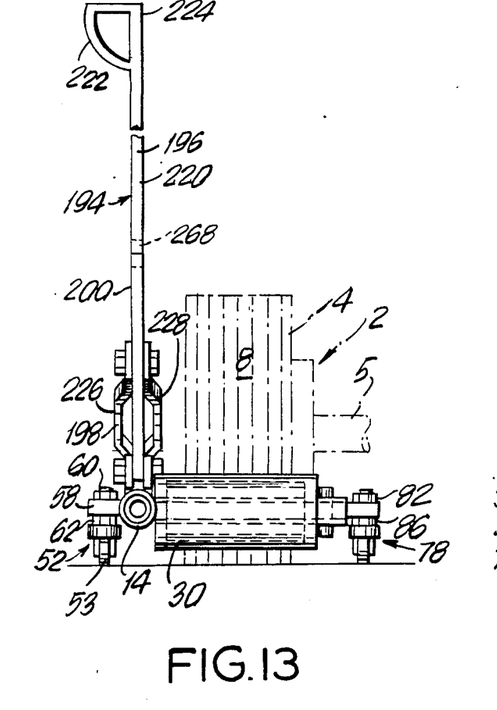
FIG. 13 is a side elevation view of a second preferred embodiment of the apparatus in accordance with this invention together with a wheel assembly before actuation of the apparatus.
Figure 14:
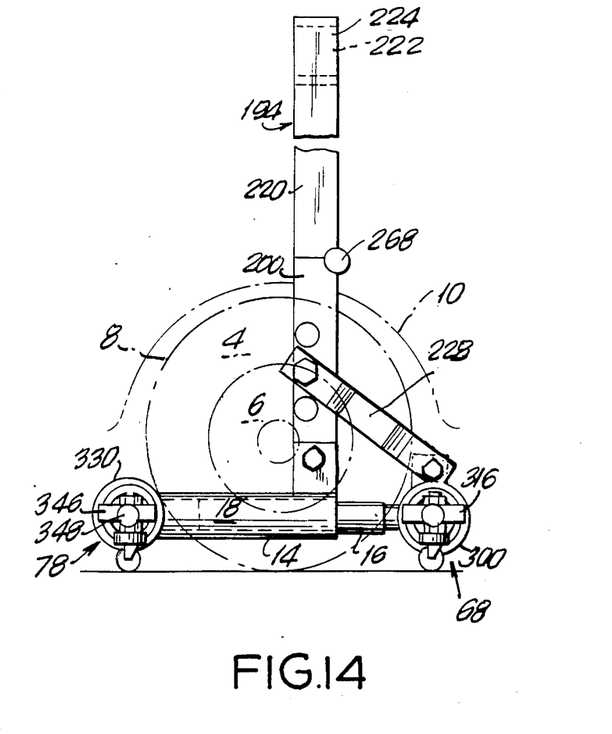
FIG. 14 is a front elevation view of a second preferred embodiment of the apparatus in accordance with this invention together with a wheel assembly before actuation of the apparatus.
Figure 15:
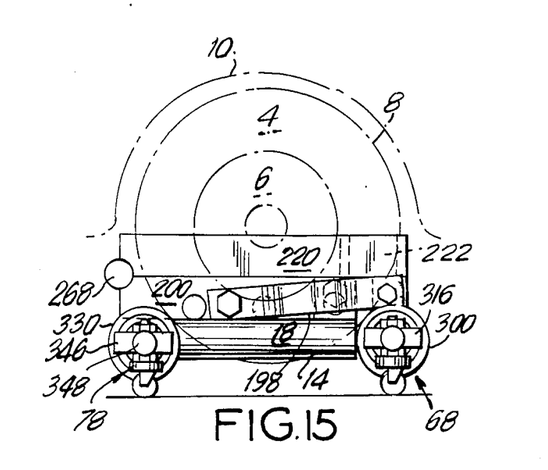
FIG. 15 is a front elevation view of a second preferred embodiment of the apparatus in accordance with this invention together with a wheel assembly after acutation of the apparatus.

FIGS. 11 through 15 show a second preferred embodiment of the invention. As seen in FIG. 11, elements similar to those described in connection with the first preferred embodiment are referred to with like numbers. Particularly, apparatus 1 has a framework 12 including a body section 14 and first and second arm members 28 and 30, respectively. As in the first preferred embodiment, body member 16 is telescopically received in body member 18. Further, arm members 28 and 30 are affixed to ends 20 and 24 of body members 28 and 39, respectively, and extend in the same fashion as those of the first embodiment to form a generally "U" shaped frame structure. However, unlike the members of the arm members of the first embodiment, the arm members of the second embodiment are cylinderical rather than angular.

Also like the first embodiment, the second embodiment is provided with transport means in the form of a plurality of caster assemblies 40, 52, 68 and 78 mounted on the apparatus framework.

Still further, the apparatus of the second embodiment has an actuator identical to that of the first embodiment. Particularly, the actuator features a lever mechanism 194 having a lever element 196 and a linkage element 198 structurally and functionally the same as that described in connection with the first embodiment.

The area where the second preferred embodiment differs from the first is with respect to the form of roller assemblies 90 and 92. While the second embodiment includes a wheel engaging means having first and second members 90 and 92, respectively, at least one member being a roller assembly, the form of roller assembly in the second embodiment is that of multiple, nested elements.

Particularly, and with reference to FIG. 11, roller assembly 90 of the second preferred embodiment includes a plurality of roller elements 300 rotatably mounted at framework arm member 28. Elements 300, in preferred form, are cylindrical and are provided with successively larger radii such that they may be mounted one upon the other in nested fashion. While not shown, roller elements may be mounted off center or be provided with an eccentric countour; e.g., like a cam. This permits the rollers to be mounted as close to the ground as possible so that the contact angle; e.g., angle ABD shown if FIG. 10a. may be as large as possible. As noted above, this increases the initial component of lift force available, and permits lift to be initiated with minimum force at handle 222.

Elements 300 may have plates, or the like, at their ends, not shown, having bores therein to permit subsequent elements to be mounted on preceding elements. Such plates are useful; for example, where the diffence in element radii between successive elements is greater than the wall thickness of the subsequent element. Elements 300 are free to rotate about arm 28, the elements being mounted coaxially with each other and arm 28 as shown. The end plates may be provided with bearings, bushings or the like to aid roller rotation. With this arrangement, the effective radius of the assembly is the radius of the outer-most roller element, the effective radius being adjustable by substituting elements of different radius as the outer-most position.

Roller assembly 90 also includes a retainer 302 for keeping elements 300 on arm 28. Retainer 302 includes a cylindrical mounting member 304 which is coaxially received at end 34 of arm 28. Member 304 includes a transverse bore 306 for receiving a bolt 308 which is arranged to pass through a companion bore 310 provided at the end 34 of arm 28. A thread 312 at the end of bolt 308 and a nut 314, or their equivalent, serve to secure the retainer assembly in place.

Retainer 302 also includes a stop 316 arranged transversely to the axis of mount member 304. Stop 316 may have any convenient shape, and in preferred form is a rectangular member oriented orthogonally to the major axis of roller elements 300. Stop 316 has a major axis length sufficient to span the larges radius roller element which might be used in assembly 90. Stop 316 is arranged to abut the end of roller element 300 when stop 302 is mounted on arm 28, thereby maintaining elements 300 in place without impeding their rotation.

Finally, restraint 302 includes an extension 318 for mounting caster assembly 68. Extension 318 includes a bore 320 for receiving caster threaded shaft 70 which is secured to the extension by nuts 74 and 76 as noted in connection with the first preferred embodiment.

Roller assembly 92 in the second preferred embodiment is substantially the same as assembly 90 of the second embodiment, and need not be further discussed.

In operation, the apparatus of the second embodiment is substantially the same as that of the first, with the exception of the roller assemblies as noted. Particularly, roller assembly adjustments in the second embodiment are made simply by removing retainers 302, 332, and substituting roller elements of desired radius at the outer-most position. Other aspects of operation of the second embodiment may be understood with reference to FIGS. 12 to 15, and the description of apparatus operation given in connection with the first embodiment.

With regard to construction, the preferred embodiments of this invention may be made of any suitable materials; e.g., iron, steel, high strength plastics, etc. and with an assembly technique consistent with the materials selected.

While this invention has been described in its preferred forms, it will be appreciated that changes may be made in form, construction and arrangement of the elements without departing from its spirit or scope.

What I claim is:

1. Apparatus that jacks and, thereafter, dollies a vehicle wheel assembly while the assembly is affixed to the vehicle, the assembly including a pneumatic tire, a wheel and an axle, the apparatus comprising:

structural means for constituting an apparatus framework, the framework including a body section having a first member and a second member, the first and second body section members being movable relative to one another, the framework also including a first arm member connected to the first body member, and a second arm member connected to the body section second member;

transport means for rendering the apparatus movable;

engaging means which are adjustable for interacting with the wheel assembly, the engaging means including a first element connected to the framework first arm member, and a second element connected to the framework second arm member, wherein at least one of the engaging means elements includes a roller assembly having means for adjusting the effective roller assembly radius; and actuator means which is connected to the framework and which cooperates with the engaging means such that when the actuator means is activated, the engaging means elements are forced into contact with the pneumatic tire causing the tire to ride over the roller assembly of the engaging means and lift the wheel assembly while forming the framework into a carriage for receiving the wheel assembly, and which actuator means also cooperates with the engaging means to provide a mechanical advantage, for lifting the wheel assembly onto the carriage which may be varied by adjusting the effective roller assembly radius of the engaging means relative to the wheel assembly.

2. The apparatus of claim 1, wherein the roller assembly means for adjusting the effective roller assembly radius includes elements for pivotally mounting the roller assembly.

3. The apparatus of claim 2 wherein the roller assembly includes a plurality of rotatably mounted roller elements, the roller elements forming a convex arcuate contour for contacting the pneumatic tire.

4. The apparatus of claim 3 wherein the body section first member has a major axis oriented approximately parallel to a major axis of the body section second member, and wherein the first arm member has a major axis oriented approximately orthogonally to the major axis of the body section first member and the second arm member has a major axis oriented approximately orthogonally to the major axis of the body section second member, the first arm member being affixed to the body section first member and the second arm member being affixed to the body section second member such that the first arm member and the second arm member extend from the body section in approximately the same direction to form, with the body section, the apparatus framework.

5. The apparatus of claim 4 wherein the actuator means is a lever mechanism having at least a lever element and a linkage element, the linkage element being connected to the body section first member and the lever element being connected to the body section second member, the lever element and the linkage elements also being connected to each other so as to provide a mechanical advantage in cooperation with the roller assembly which may be varied.

6. The apparatus of claim 5 wherein the transport means includes a plurality of casters mounted on the apparatus framework.

7. The apparatus of claim 1 wherein the roller assembly means for adjusting the effective roller assembly radius includes one or more nested, rotatably mounted and removable roller elements, the outermost of which may be replaced to adjust the effective radius of the roller assembly.

8. The apparatus of claim 7 wherein the roller assembly includes a removable retainer for retaining the one or more roller elements on the apparatus framework.

9. The apparatus of claim 8 wherein the body section first member has a major axis oriented approximately parallel to a major axis of the body section second member, and wherein, the first arm member has a major axis oriented approximately orthogonally to the major axis of the body section first member and the second arm member has a major axis oriented approximately orthogonally to the major axis of the body section second member, the first arm member being affixed to the body section first member and the second arm member being affixed to the body section second member such that the first arm member and the second arm member extend from the body section in approximately the same direction to form the apparatus framework.

10. The apparatus of claim 9 wherein the actuator means is a lever mechanism having at least a lever element and a linkage element, the linkage element being connected to the body section first member and the lever element being connected to the body section second member, the lever element and linkage element also being connected to each other so as to provide a mechanical advantage in cooperation with the roller assembly which may be varied.

11. The apparatus of claim 9 wherein the transport means includes a plurality of casters mounted on the apparatus.

12. Apparatus for jacking and dollying a vehicle wheel assembly while the assembly is affixed to the vehicle, the assembly including a pneumatic tire, a wheel and an axle, the apparatus comprising:

structural means for constituting the apparatus framework, the structural means including a body section having a first member and a second member, the first and second body section members being movable relative to one another, the structural means also including a first arm member connected to the first body section member and a second arm member connected to the body section second member;

transport means associated with the framework for rendering the apparatus movable;

engaging means for interacting with the wheel assembly, the engaging means including a first element connected to the first arm member and a second element connected to the second arm member, at least one of the engaging means elements including a roller assembly which permits the pneumatic tire to ride over the roller assembly as the engaging means interact with the wheel assembly; and an actuator means which cooperates with the engaging means to form the engaging means first and second elements, together with the apparatus framework, into a carriage for receiving the wheel assembly and which also cooperates with the roller assembly of the engaging means to provide a mechanical advantage for lifting the wheel assembly onto the carriage, the actuator including a lever mechanism having at least a lever element and a linkage element, the lever element being pivotally connected to the body section first member and the linkage element being pivotally connected to the second body section member, the lever element and the linkage element being also pivotally connected to one another, wherein the pivotal connection of the lever element to the body section first member is spaced from the framework by a distance greater than the distance the pivotal connectin of the linkage element to the body section second member is spaced from the framework, so that when the wheel assembly is lifted onto the carriage, at least a portion of the lever element and the linkage element are disposed at respective angles below a line extending between the lever element pivot at the body section first member and the linkage element pivot at the body section second member, and the body section first and second members pass through a position of maximum proximity and, thereafter, diverge so as to lock the body section members in place.

* * * * *